Jan. 17, 1950  A. R. SMITH ET AL  2,494,674
GLASS SEVERING MECHANISM
Filed Feb. 9, 1948  6 Sheets-Sheet 1

Inventors
G. A. Lee
A. R. Smith
C. J. Hopkins
By Glascock Downing & Seebold Attys.

Jan. 17, 1950

A. R. SMITH ET AL 2,494,674

GLASS SEVERING MECHANISM

Filed Feb. 9, 1948

Inventors
G. A. Lee.
A. R. Smith
C. J. Hopkins
By Glascock Downing & Seebohm Attys Inventors
G. A. Lee
A. R. Smith
C. J. Hopkins
By Glascock Downing Weebold
Attys.

Patented Jan. 17, 1950                                                                                              2,494,674

UNITED STATES PATENT OFFICE

2,494,674

GLASS SEVERING MECHANISM

Arthur Ronald Smith, Birmingham, and George
Arthur Lee and Cyril John Hopkins, Cuffley,
England Application February 9, 1948, Serial No. 7,026
In Great Britain December 14, 1944

Section 1, Public Law 690, August 8, 1946
Patent expires December 14, 1964

8 Claims. (Cl. 49—48)

This invention relates to mechanisms for severing glass articles of tubular or like form, and particularly mechanisms for severing the neck portions of partially formed glass ampoules which are required to be subsequently filled with liquid drugs or other substances and then sealed, the object of the invention being to provide an improved mechanism for effecting the severing operation automatically.

The invention comprises the combination of a horizontal track along which the articles can be progressively moved, a rotary spindle adapted to carry a scoring wheel, means whereby each article in turn can be temporarily held in contact with the wheel, means for rotating the article in contact with the wheel, and an arm adapted first to lift the scored article off the track and cause one end of the article to be struck against an anvil for detaching the waste portion of the article, and subsequently to transfer the main part of the article to a discharge position, together with means for co-ordinating the actions of the various parts of the mechanism.

In the accompanying sheets of explanatory drawings.

Figure 1:
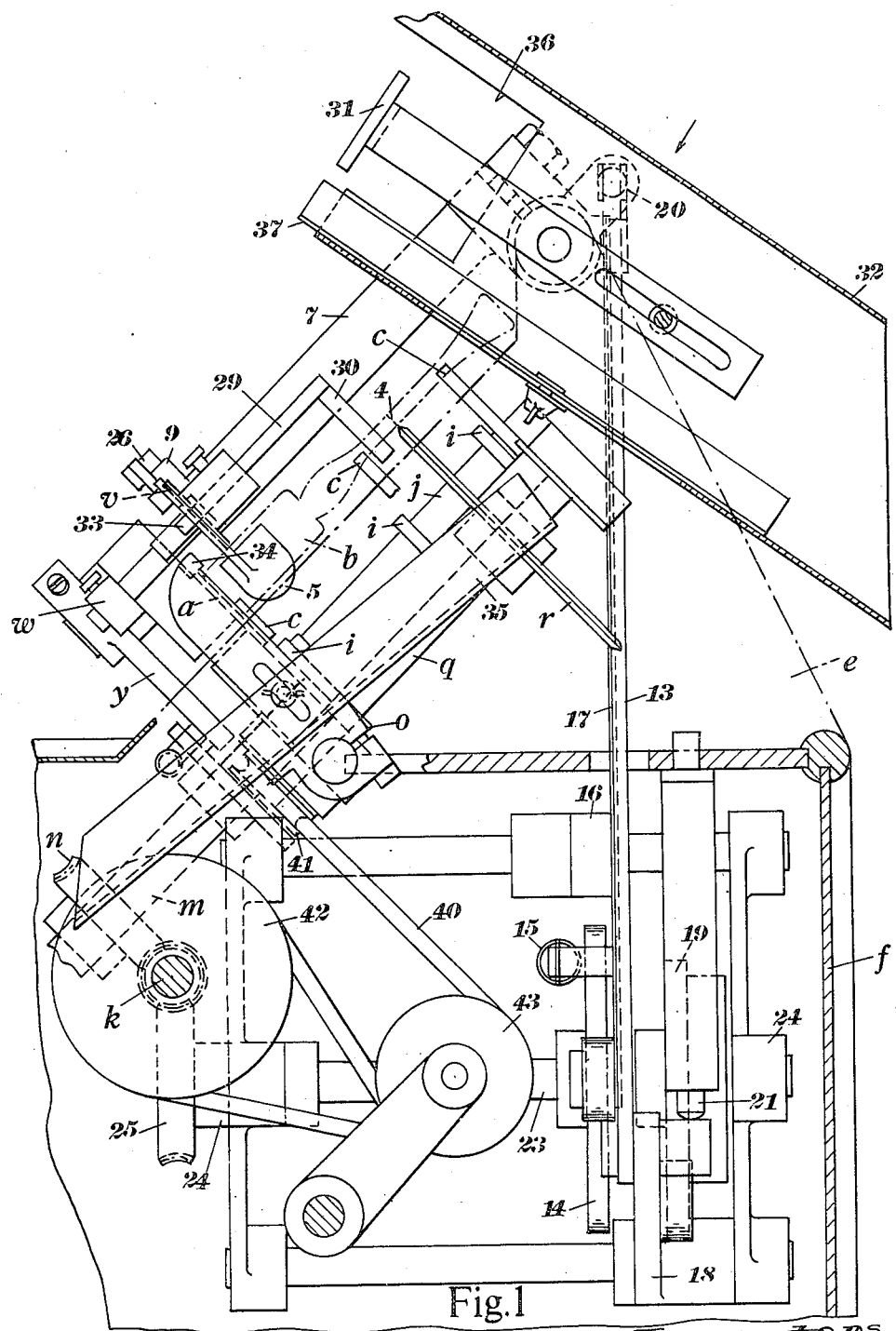
Figure 1 is a part sectional side view, with some of the parts broken away, of mechanism constructed in accordance with the invention for severing waste neck portions from small glass ampoules which are required to be subsequently filled with liquid drugs or other substances and then sealed.

In carrying the invention into effect as shown, we employ a narrow horizontal support $a$ on which the lower ends of small glass ampoules as $b$ can rest, these ampoules having long necks which are required to be severed at positions intermediate their ends. As viewed in an endwise direction the support $a$ is suitably tilted so that the ampoules $b$ can be supported thereon with their axes inclined to the vertical as shown in Figure 1. At one side of the support $a$ is arranged a track along which the ampoules $b$ can be moved. This track comprises three horizontal rails $c$ arranged parallel with each other and with the support $a$. One of the track rails $c$ is situated adjacent to the support $a$ and forms a rear support for the lower ends of the ampoules $b$. Another of the track rails $c$ is arranged to form a rear support for the ampoules $b$ near the outer ends of their necks. The third track rail $c$, which is shorter than and situated between the other two, forms at the discharge end of the track a rear support for the necks of the ampoules $b$ at a position below nicks formed in the necks in the manner hereinafter described. It will be seen that the bases of the ampoules $b$ rest on the support $a$, and that the rear sides of the ampoules lean against the front edges of the track rails $c$, these edges being situated in an inclined plane, and being notched or corrugated so as to form depressions for retaining the ampoules at a convenient distance apart. The track rails $c$ and the support $a$ are carried by a frame $e$ on the upper side of a casing $f$ hereinafter referred to.

For propelling the ampoules $b$ along the track rails $c$, we employ three parallel bars $i$ of approximately the same lengths as the track rails. These bars $i$ are arranged horizontally at positions adjacent to the track bars $c$, and are interconnected by transverse rods $j$, the front edges of the bars being notched or corrugated for engagement with the ampoules. Any convenient mechanism is employed for imparting a compound reciprocatory motion to the propelling bars $i$, such motion consisting of a forward lateral movement whereby the ampoules $b$ are carried out of the adjacent depressions in the track rails $c$, a longitudinal movement whereby the ampoules are carried along the support $a$, a retractive lateral movement whereby the ampoules are allowed to occupy the next depressions in the track rails, and finally an idle return longitudinal movement whereby the propelling bars are returned to their initial positions. In the example shown the mechanism for actuating the propelling bars $i$ comprises a driving shaft $k$ (Figure 1) which is adapted to receive motion from any convenient source, such as an electric motor (not shown), and is arranged in the casing $f$, a pair of driven shafts $m$ connected by worm gearing as $n$ to the driving shaft and extending through the upper side of the casing, and discs $o$ (Figures 1 and 2) secured to the upper ends of the driven shafts and connected by crank pins $p$ to the lower propelling bar. The ampoules *b* are fed successively by an attendant or automatically to the receiving end of the support *a*, and by the action of the propelling bars *i* are caused to travel intermittently along the track rails *c*.

In association with and transversely to the track rails *c* is arranged a rotary spindle *q* on which is adjustably secured a disc *r* having a peripheral edge for scoring the necks of the ampoules *b*, and on the support are mounted rollers *s* whereby each ampoule in turn can be supported and rotated when it reaches a scoring position opposite to the disc, the lower track rail being gapped to accommodate the supporting rollers. The spindle *q* is adapted to receive motion from the driving shaft *k* through any convenient means, such as a flexible belt 40 passing around pulleys 41, 42 on the spindle and shaft, and also around an idle pulley 43. If desired two or more pulleys of different sizes may be provided on both the spindle *q* and shaft *k*, so that the belt 40 can be shifted from one pair of these pulleys to another for varying the speed of the spindle. The rollers *s* are operable by gearing *t* from a spindle *u* which is driven in any convenient manner from the driving shaft *k*. At a position adjacent to the supporting rollers *s* there is arranged a rubber or other pressure roller *v* which is carried by the outer end of a lever arm *w* secured on a spindle *x*, the latter also having adjustably secured to it another lever arm *y* which is shorter than the first mentioned lever arm and forms therewith a bell crank lever. This bell crank lever is loaded by a spring *z* acting on its shorter arm *y*, and is adapted under the control of a cam 2 acting on the outer end of the shorter arm to move the pressure roller *v* into and out of contact with the ampoule *b* being rotated by the supporting rollers *s*, the cam being mounted on one of the shafts *m*. The arrangement is such that during the travel of each ampoule *b* along the track rails *c* it is temporarily supported and rotated by the supporting rollers *s*, and while it is in this condition its neck is pressed by the pressure roller *v* into contact with the scoring disc *r*, causing a fine nick as 4 (Figure 1) to be scored by the disc around the neck.

After being scored as above described each ampoule *b* continues its progressive movement along the track rails *c* under the action of the propelling bars *i*, and when it completes its travel it is picked off the track rails *c* by a pair of fingers 5, 6 on one end of an arm 7 hereinafter termed the transferring arm, the fingers being carried by a plate 8 adjustably secured to a boss 9 on the said end of the transferring arm. The other end of the transferring arm 7 has formed on or secured to it a sleeve 10 which is slidable on a horizontal guide bar 11 arranged parallel with and at the upper side of the track rails *c*. The sleeve 10 is movable axially in one direction by a spring 12 on the guide bar 11, and in the opposite direction by a lever 13, under the control of a cam 14 against which one end of the lever is caused to bear by a loading spring 15, the lever being connected at its other end to the sleeve, and at an intermediate position to one end of a link 16 which at its opposite end is connected to the casing *f*. Also the sleeve 10 is adapted to receive rocking movements through the medium of a link 17 and lever 18 under the control of another cam 19. The link 17 serves to interconnect a short arm 20 on the sleeve 10 and one end of the lever 18 which at this end is adapted to bear against an adjustable abutment 21 under the action of a loading spring 22, and which at its opposite end is connected to the casing *f*, the cam 19 being arranged to act on an intermediate part of the lever. The two cams 14, 19 are mounted on a shaft 23 which is supported by bearings 24 in the casing *f*, and which is connected to the driving shaft *k* by worm gearing 25. The finger 5 is adjustably or otherwise secured to its supporting plate 8 on the transferring arm 7, and the other finger 6 is pivoted at 26 to this plate. Also the pivoted finger 6 is loaded by a spring 27 which tends to move it towards the other finger 5, the extent of this movement being limited by a stop 28 on the plate 8. Moreover, there is adjustably secured to the boss 9 on the transferring arm 7, a rod 29 having at one end an arm 30 which is adapted to form a lateral abutment whereby the neck of each ampoule *b* picked up by the fingers 5, 6, can be supported at the inner side of the nick 4 in the neck.

Figure 2:
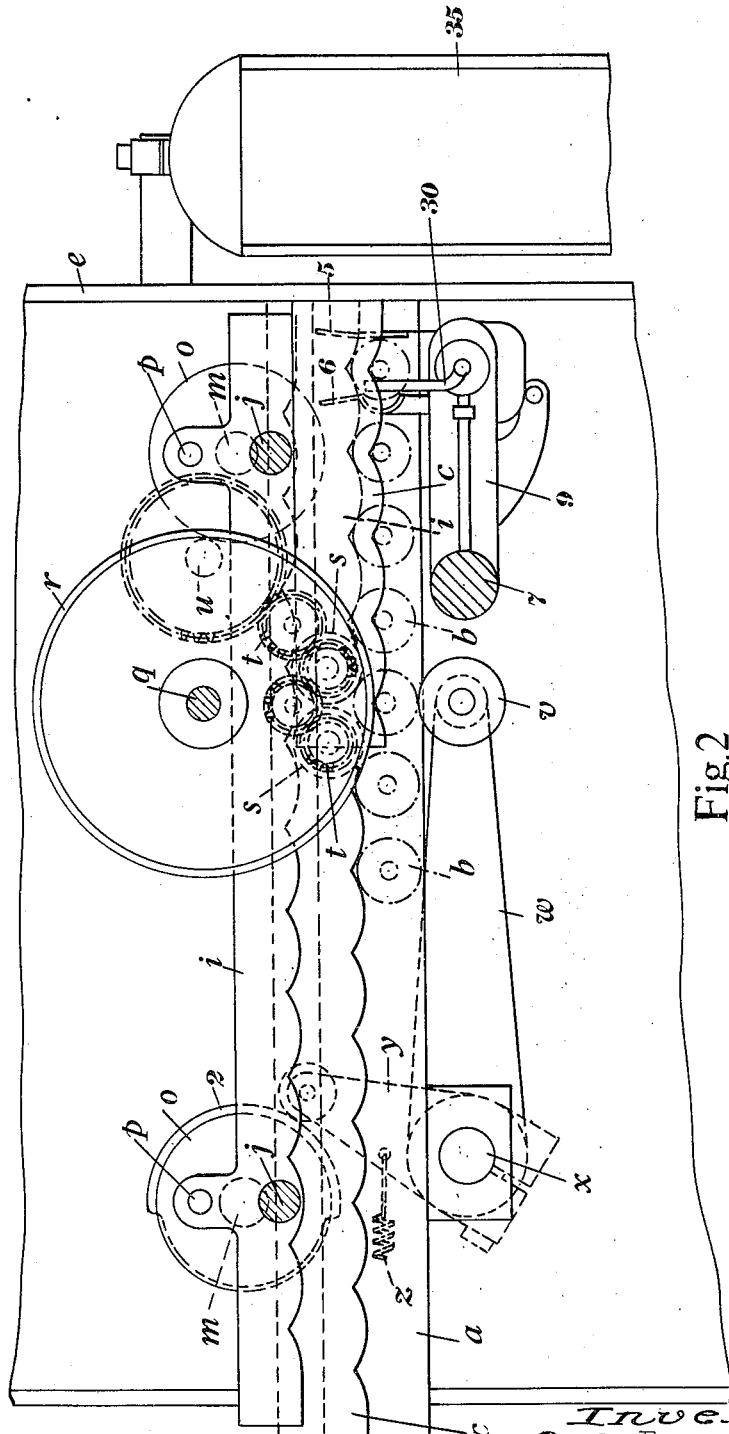
Figure 2 is a part sectional plan looking in the direction of the arrow shown in Figure 1.
Figure 3:
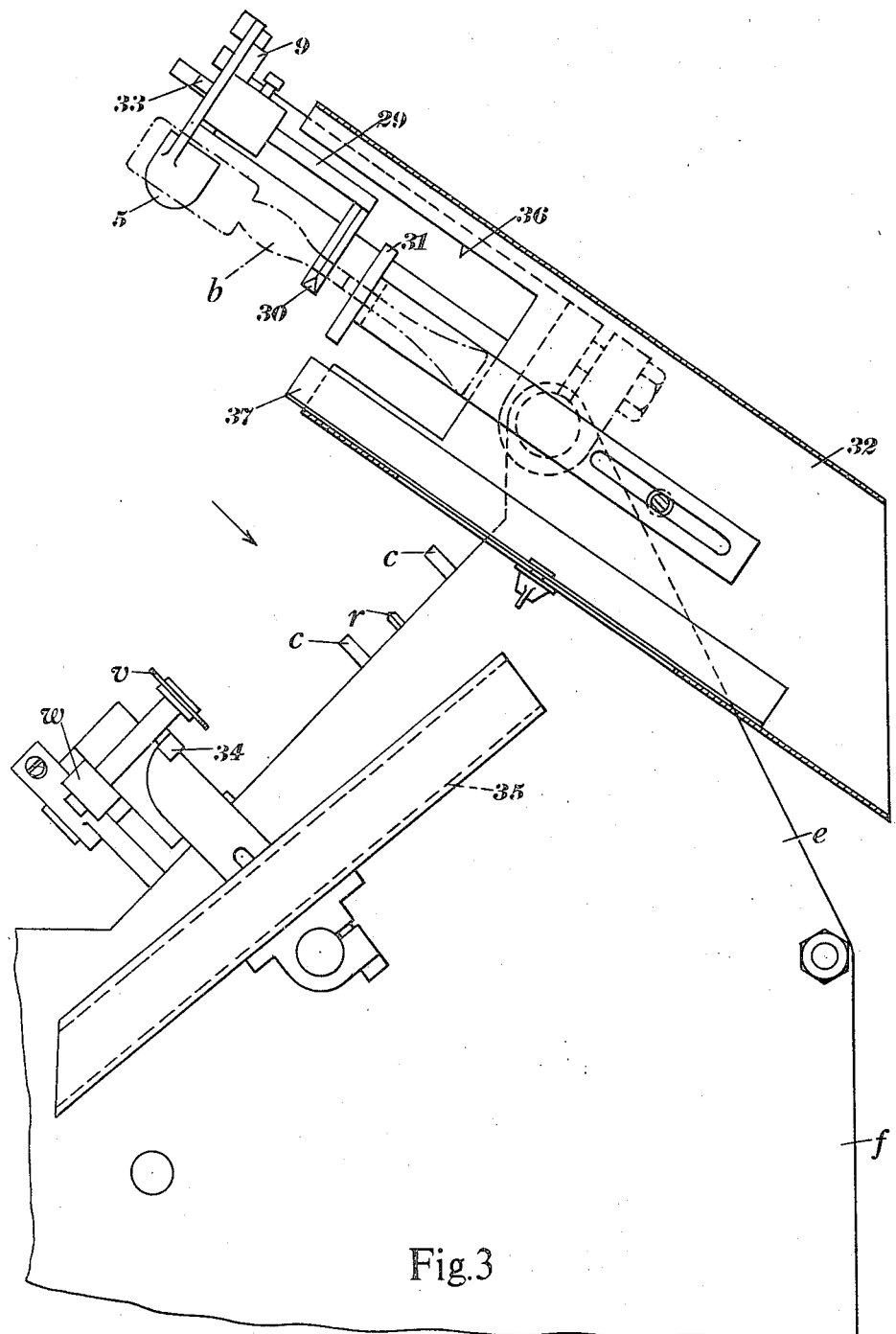
Figure 3 is a side view similar to Figure 1 but showing the ampoule-transferring arm in a different position.
Figure 4:
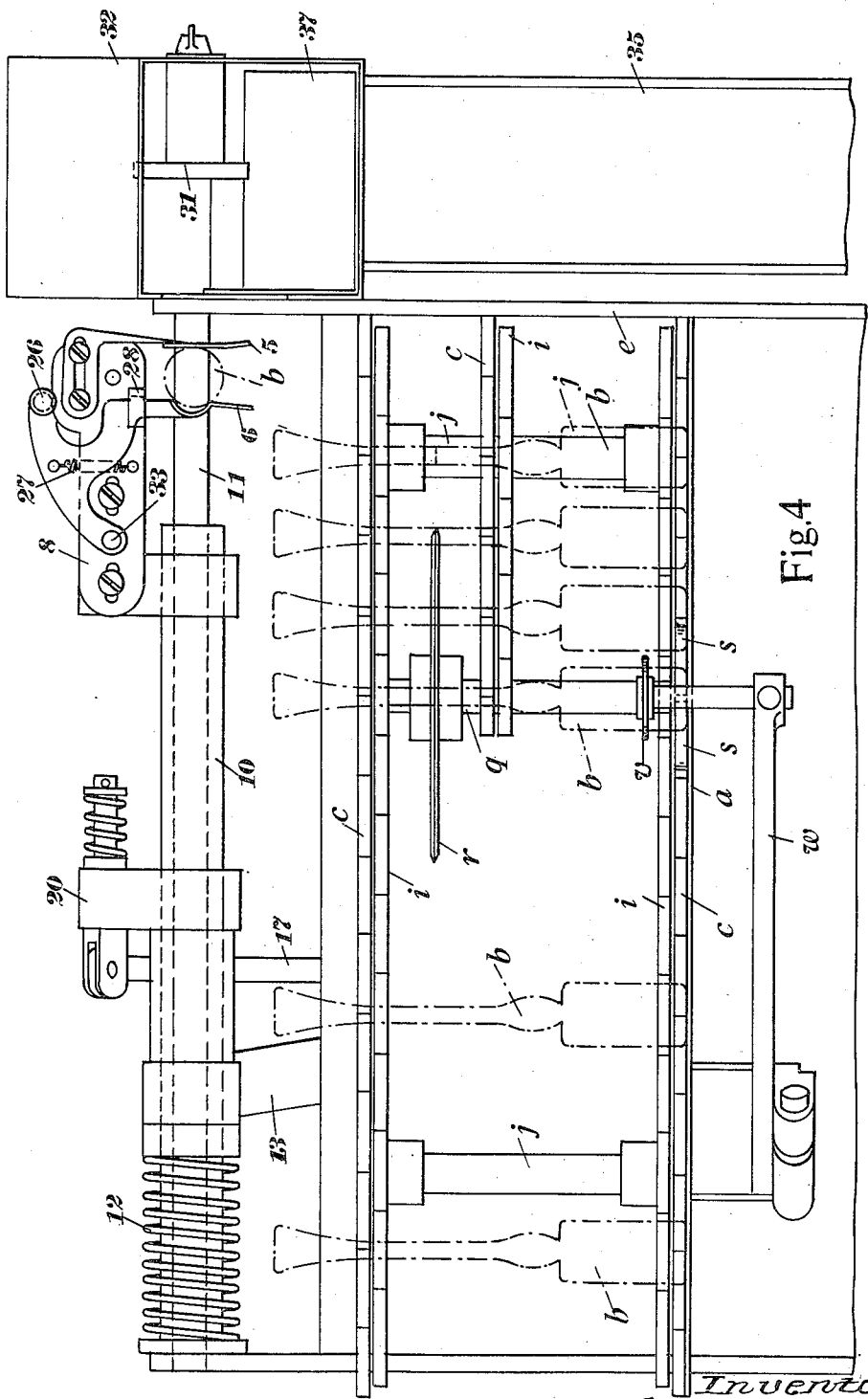
Figure 4 is a front view of the mechanism looking in the direction of the arrow shown in Figure 3.
Figure 5:
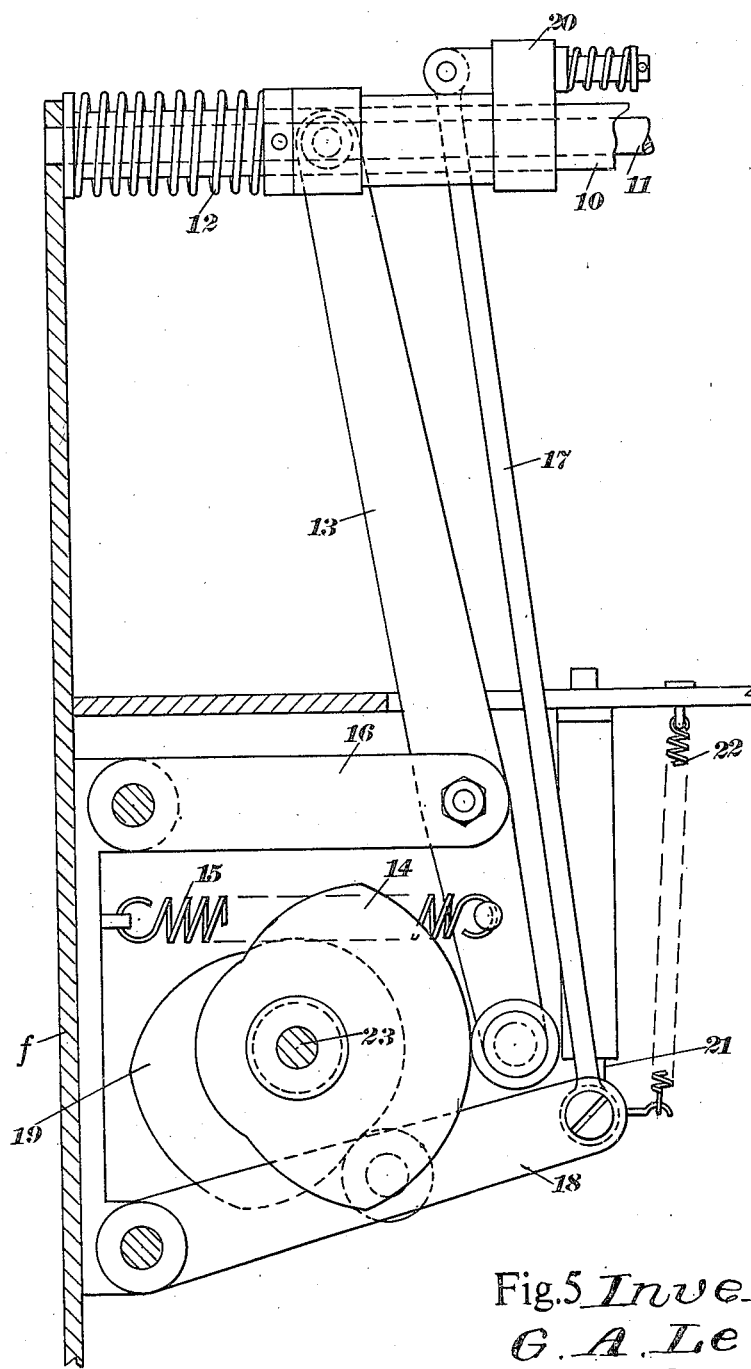
Figure 5 is a fragmentary sectional front view of the part of the mechanism shown at the left hand side of Figure 4.
Figure 6:
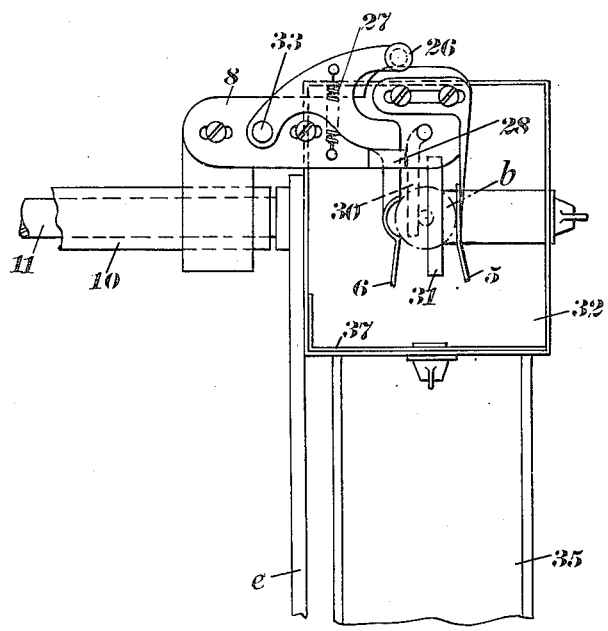
Figure 6 is a fragmentary front view showing the ampoule-transferring arm in another position.
Figure 7:
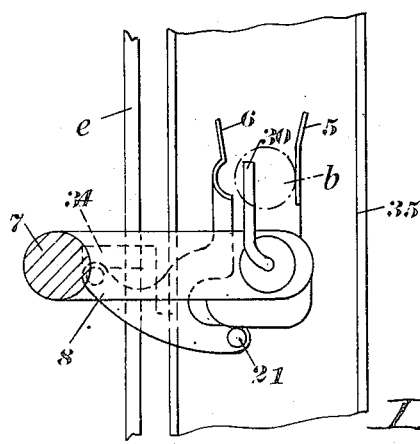
Figure 7 is a similar view to Figure 6 but showing the arm in yet another position.

The arrangement of the transferring arm 7 and the associated parts is such that at appropriate intervals in successive cycles of operation of the mechanism above described, the transferring arm first swings downwardly to the position shown in Figures 1 and 2, and picks up the ampoule *b* on the discharge end of the track rails *c*, and then returns to its initial position (Figures 3 and 4) with the ampoule between the fingers 5, 6, whereupon the transferring arm is given a lateral movement which causes the outer or waste portion of the neck of the ampoule to be struck against a fixed anvil 31 in a chute 32, and thereby severed at the nick 4 previously scored in the neck, the main portion of the neck being meanwhile supported by the abutment 30. The severed waste portion of the neck falls down the chute 32 to a collecting position. The transferring arm 7 is then again swung downwardly to bring a projection 33 on the pivoted finger 6 into contact with an adjustable stop 34 on another chute 35. This causes the fingers 5, 6 to release the ampoule *b* and allow it to fall on to the chute 35 which serves to convey the ampoule to a collecting position or to an automatic filling and sealing machine. Subsequently the transferring arm 7 is returned to its initial position in readiness for the next cycle of operations.

To permit the movement of the ampoules *b* by the transferring arm 7 into the first mentioned chute 32 the latter is formed at one side with a gap 36 (Figure 1). Also, to permit the subsequent downward movement of the transferring arm 7, the adjacent end of the chute 32 may be formed with an adjustable base piece 37.

Whilst the invention is primarily intended for severing the waste portions of small glass ampoules prior to filling, it may be applied to the severing of other glass articles of tubular or like form, and subordinate mechanical details may be modified to meet different requirements.

Having thus described our invention what we claim as new and desire to secure by Letters Patent is:

1. Mechanism for severing waste portions from hollow glass articles, comprising in combination a horizontally arranged stationary track on which the articles can be supported, means for intermittently moving the articles along said track, a rotary spindle at one side of said track, a scoring wheel mounted on said spindle and arranged so that the articles on said track can in turn occupy a position in contact with said wheel, means for temporarily pressing the article occupying said position against said wheel so that the article is scored by said wheel, means for rotating the article in contact with said wheel so that the scoring effected by said wheel extends around the article, a device for lifting the scored articles in turn off said track and transferring the lifted articles to a discharge position, means for actuating said device, and an anvil against which each article is struck whilst being moved by said device, and which serves to sever the article at the scored position.

2. Mechanism for severing waste portions from hollow glass articles, comprising in combination a horizontally arranged stationary track on which the articles can be supported, means for intermittently moving the articles along said track, a rotary spindle at one side of said track, a scoring wheel mounted on said spindle and arranged so that the articles on said track can in turn occupy a position in contact with said wheel, means including a spring loaded lever and a pressure roller on said lever for temporarily pressing the article occupying said position against said wheel so that the article is scored by said wheel, a rotary cam for actuating said lever, means for rotating the article in contact with said wheel so that the scoring effected by said wheel extends around the article, a device for lifting each of the scored articles in turn off said track and transferring the lifted articles to a discharge position, means for actuating said device, and an anvil against which each article is struck whilst being lifted by said device, and which serves to sever the article at the scored position.

3. Mechanism for severing waste portions from hollow glass articles, comprising in combination a horizontally arranged stationary track on which the articles can be supported, means for intermittently moving the articles along said track, a rotary spindle at one side of said track, a scoring wheel mounted on said spindle and arranged so that the articles on said track can in turn occupy a position in contact with said wheel, means for temporarily pressing the article occupying said position against said wheel so that the article is scored by said wheel, rollers whereby the article in contact with said wheel is supported, means for rotating said rollers to impart rotary motion to the article supported thereby so that the scoring effected by said wheel extends around the article, a device for lifting the scored articles in turn off said track and transferring the lifted articles to a discharge position, means for actuating said device, and an anvil against which each article is struck whilst being moved by said device, and which serves to sever the article at the scored position.

4. Mechanism for severing waste portions from hollow glass articles, comprising in combination a horizontally arranged stationary track on which the articles can be supported, means for intermittently moving the articles along said track, a rotary spindle at one side of said track, a scoring wheel mounted on said spindle and arranged so that the articles on said track can in turn occupy a position in contact with said wheel, means for temporarily pressing the article occupying said position against said wheel so that the article is scored by said wheel, means for rotating the article in contact with said wheel so that the scoring effected by said wheel extends around the article, a device for lifting the scored articles in turn off said track and transferring the lifted articles to a discharge position, said device comprising a movable arm, a pair of relatively movable article-gripping fingers on the outer end of the arm, and a spring controlling relative movement of the fingers, means for actuating said arm to cause said fingers to effect the article-lifting and transferring operations of said device, and an anvil against which each article is struck whilst being moved by said fingers, and which serves to sever the article at the scored position.

5. Mechanism as claimed in claim 4 and having a projection on one of the article-gripping fingers, and a fixed stop which serves by contact with said projection to separate said fingers for releasing the article carried thereby after the severing operation.

6. Mechanism as claimed in claim 4 and having in combination a sleeve rigid with and situated at the inner end of the arm carrying the article-gripping fingers, a horizontal guide on which said sleeve is slidable and rockable, and cam-controlled means for imparting lateral and rocking movements to said arm through said sleeve.

7. Mechanism as claimed in claim 4 and having a chute down which detached waste portions of the articles can fall after the severing operations, and which contains the anvil for effecting the severing operations, said chute being gapped and provided with an adjustable base piece for permitting the required movements of the finger-carrying arm.

8. Mechanism as claimed in claim 4 and having a chute down which detached waste portions of the articles can fall after the severing operations, and which contains the anvil for effecting the severing operations, said chute being gapped and provided with an adjustable base piece for permitting the required movements of the finger-carrying arm, and a second chute to which the main parts of the articles can be tranferred by said arm after the severing operations.

ARTHUR RONALD SMITH.
GEORGE ARTHUR LEE.
CYRIL JOHN HOPKINS.

REFERENCES CITED

The following references are of record in the file of this patent:

UNITED STATES PATENTS

| Number | Name | Date |
|---|---|---|
| 2,112,118 | Rowe | Mar. 22, 1938 |
| 2,258,408 | Cozzoli | Oct. 7, 1941 |
| 2,362,115 | Cline | Nov. 7, 1944 |